4 Sheets--Sheet 1.

D. B. MONTAGUE.
Hot-Air Furnaces.

No. 135,003.  Patented Jan. 21, 1873.

Witnesses,  Inventor,

4 Sheets--Sheet 2.

D. B. MONTAGUE.

Hot-Air Furnaces.

No. 135,003.

Patented Jan. 21, 1873.

4 Sheets--Sheet 3.

D. B. MONTAGUE.
Hot-Air Furnaces.

No. 135,003.    Patented Jan. 21, 1873.

Witnesses,
C. E. Howard
Clarence E. Buckland

Inventor,
Dwight B. Montague
By S. A. Curtis, his Atty.

AM. PHOTO-LITHOGRAPHIC CO. N.Y. (OSBORNE'S PROCESS)

4 Sheets--Sheet 4.
D. B. MONTAGUE.
Hot-Air Furnaces.
No. 135,003.
Patented Jan. 21, 1873.
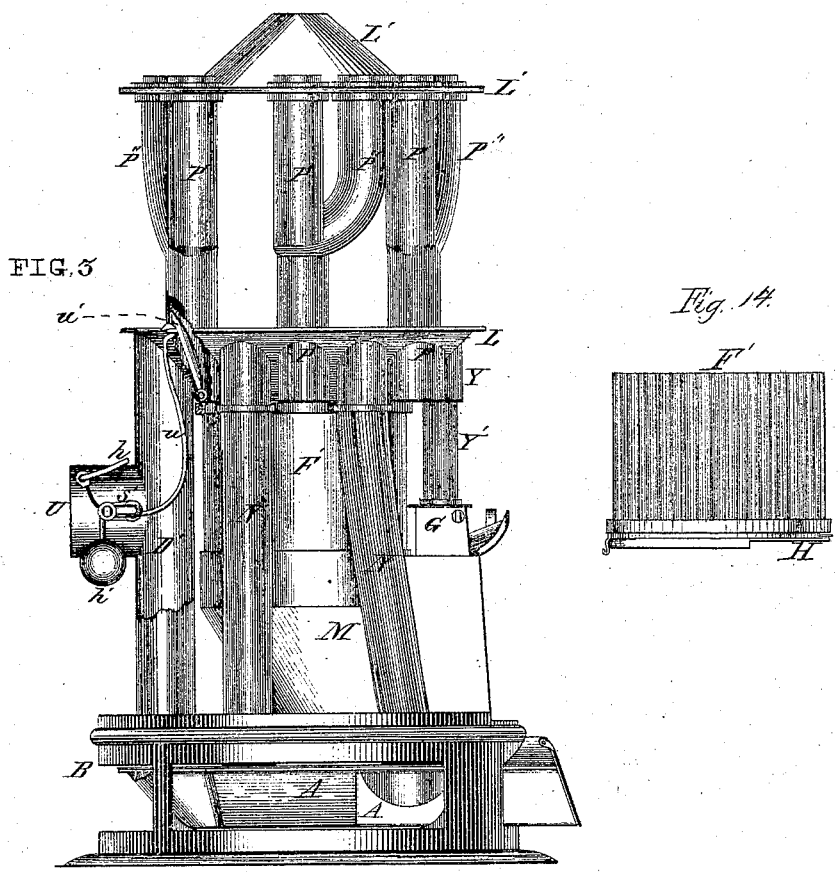

UNITED STATES PATENT OFFICE.

DWIGHT B. MONTAGUE, OF SPRINGFIELD, MASSACHUSETTS.

IMPROVEMENT IN HOT-AIR FURNACES.

Specification forming part of Letters Patent No. 135,003, dated January 21, 1873.

*To all whom it may concern:*

Be it known that I, DWIGHT B. MONTAGUE, of Springfield, in the county of Hampden and State of Massachusetts, have invented a new and useful Improvement in Furnaces; and I do hereby declare that the following is a full, clear, and exact description thereof, reference being had to the accompanying drawing making a part of this specification, and to the letters of reference marked thereon, in which—

Figure 1:
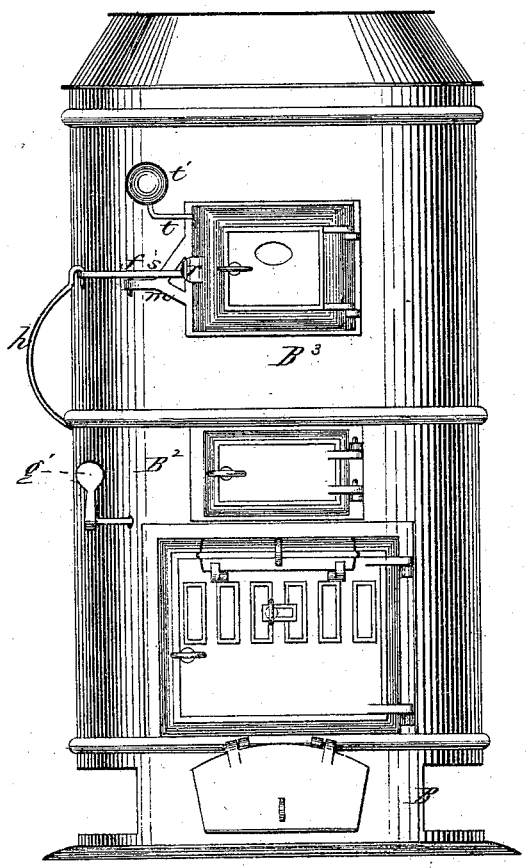
Figure 2:
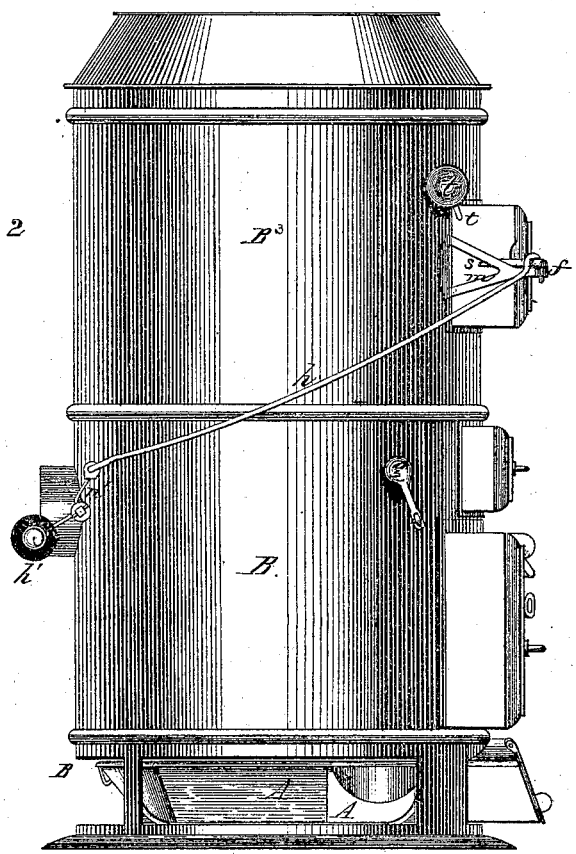
Figure 4:
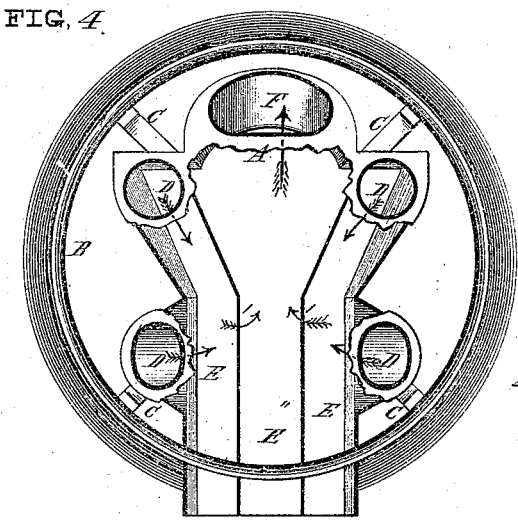
Figure 5:
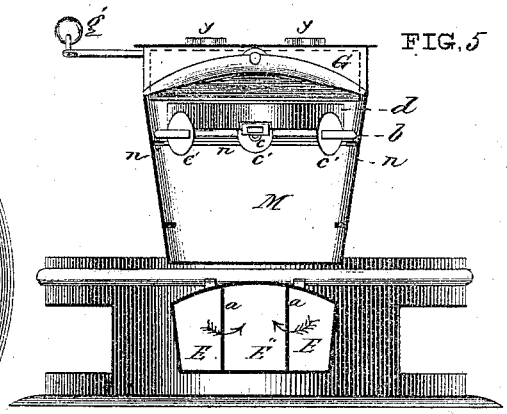
Figure 11:
Figure 6:
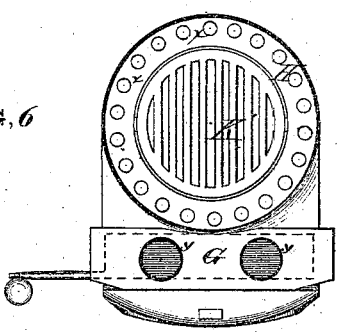
Figure 10:
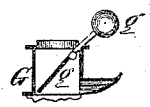
Figures 12, 13:
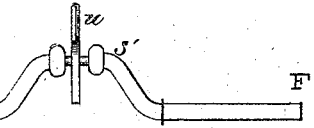
Figure 7:
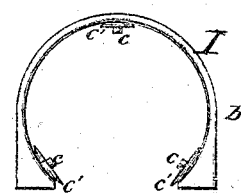
Figures 8, 9:
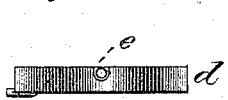

Figure 1 is a front view of a furnace made according to my invention. Fig. 2 is a side view of the same. Fig. 3 is a side view with the casing removed and showing the arrangement of the pipes; Fig. 4 is a plan view of the reservoir and the smoke-pipes leading thereto; Fig. 5 is a front view of the grate, ash-box, dust-flue, and reservoir; Fig. 6 is a plan view of the grate, base-plate of the fire-pot, and the dust-flue; Fig. 7 is a plan view of the frame and wheels upon which the grate rests; Fig. 8 is a side view of the grate and its ring; Fig. 9 is a side view of the same, showing the grate tilted; Fig. 10 is a transverse section of the dust-flue and its damper; Fig. 11 is a side view of one of the partitions of the reservoir; Fig. 12 is a plan view of the crank which operates the back damper when the feed-door of the furnace is opened or closed.

My invention relates to the construction and arrangement of a furnace for heating buildings, whereby a greater amount of radiating-surface is obtained for heating the cold air as it passes through the furnace, and whereby the dust is better carried off by the draft during the operation of shaking down the ashes; and also whereby the heat is prevented from being, in a great measure, lost by radiation through the feed-door. My invention consists of a series of pipes having branches arranged within the combustion-chamber through which the air is conducted while being heated. It also consists in the construction and arrangement of a chamber which I denominate the dust-flue, having a damper therein, and a weight attached to the stem of said damper, and through this chamber to the combustion-chamber the dust is carried off when the grate is being shaken to remove the ashes.

That others skilled in the art may be able to make and use my invention, I will proceed to describe its construction and operation.

In the drawing, B represents the lower part of the furnace, set up upon and strengthened by the braces C, and supporting the reservoir A. This reservoir receives the smoke-pipes from the combustion-chamber at the points D D; and it is also divided into compartments or flues by the partitions $a$ $a$, and these flues communicate with each other through the openings 1 1, shown in Fig. 11, and in position in Fig. 4. This reservoir supports the ash-box M, in the upper part of which is a ledge, which supports a frame, I, shown in Fig. 7. This frame has three spurs upon the inside, upon which are placed the wheels or rollers $c$, each having a wide flange or guide, $c'$, and these wheels are free to rotate upon said spurs. The grate-ring $d$, which carries the grate, rests upon these rollers $c$, and the ring $d$ supports the grate by means of trunnions $e$, having their bearings in corresponding cavities or recesses in the ring, so that the grate may swing upon its trunnions within the ring in a vertical direction, as shown in Fig. 9, and when so placed together the frame I is pushed in above, and rests upon the ledge or shelf $n$. The ash-box has a circular plate, H, on top, which is perforated with small holes $x$, as shown in Fig. 6, the grate K being just beneath it. Upon the front and top of the ash-box is a chamber, G, having two openings, $y$ $y$, in the top, which communicate with the combustion-chamber through the pipes Y' Y'. The chamber G, which I denominate the dust-flue, also contains a damper, the blade of which is shown at $g$ in Fig. 10, and which is also shown in dotted lines in Fig. 6; and a weight, $g'$, is attached to the stem of said damper to retain it in either position, whether open or shut, when so placed. The fire-pot F', shown in Fig. 14, which is corrugated, is placed upon the circular perforated plate H, and upon this rests the plate L. This plate L has the general form of the frustum of a hollow cone, and is perforated all around to receive the smoke-pipes N, which extend from their openings in said plate down to the openings D in the reservoir; and openings are made in the plate L, at Y, into which are inserted the pipes Y', which communicate with the dust-flue or chamber G; and an opening is also made in said plate L, into which is fitted the draft-pipe D', which extends from said opening down to the opening F in the reservoir, shown in Fig. 4, and the smoke-pipe U conducts the smoke and gases from said draft-pipe D' off into the chimney. Openings P P are also made in the plate L, into which are placed the hot-air pipes P', having branches P'', as shown in Fig. 3. These pipes may be arranged in a circle upon the plate L, and the dome L' is placed upon said pipes, the openings in the flange of said dome corresponding in size, number, and position with the upper end of the pipes P' and their branches P'', so that the dome is supported thereon; and to make close joints at the point of connection, the ordinary sand packing and rings may be used. Wire or iron screens or small gratings may be placed over the openings in the plate L, which open into the pipes N, to prevent coal and ashes from getting in and dropping down into the lower flue or reservoir. The pipe U has a crank, s', suspended therein, to one end of which is attached a lever having a weight, h', thereon; and to the other end of said lever is attached a rod, h. This rod extends around the furnace to the feed-door, to the frame of which door is attached a bar or support, m; and to this bar or support is pivoted, at f, a short lever, s, having the before-mentioned rod h attached to one end, and the other end is forced inward by the projection r upon the feed-door when said door is shut. To the crank s' in the smoke-pipe U a rod, u, is attached, which is connected to the back damper u', that being hinged in an inclined position to the opening in the plate L over the draft-pipe D'. To prevent the heat from being too much lost by radiation through the feed-door a curtain is fixed inside the feed-door frame, which may be turned either up or down like a damper; and to its stem t, which extends out through the door-frame, is attached a weight, t', by means of which the curtain may be held in either position in which it may be placed, whether up or down. An outside lower casing, B², incloses the space around the ash-box and fire-pot; and two similar upper casings, one being placed within the other, inclose the combustion-chamber space.

The operation of the furnace is as follows: The fire being kindled, the gases and smoke pass down through the pipes N N into the reservoir, passing first into the side-flues E of the reservoir, and thence through the opening 1 in each partition a into the middle flue E'', and thence out through the draft-pipe D'. The fire-pot, which is very much heated, and the smoke-pipes N, which are also much heated, furnish a much larger radiating-surface than is found in the ordinary furnaces, and the cold air, which passes in through the open part in B into the space around the fire-pot and pipes N, becomes heated by the large radiating-surface to which it is exposed, passes on up through the openings P and through the pipes P' and their branches P''. As these pipes P' and branches P'' are located in the combustion-chamber they are also heated very hot, and the air passing up through them becomes sufficiently expanded to fill both the pipes and the branches, and the supply of heated air is increased. While the feed-door is closed the weight t' remains in the position shown in Fig. 2, which keeps the curtain down inside the feed-door, and the free end of the lever s is pressed against by the projection r of said door. This keeps the rod h drawn forward, and the lever n' and its weight h' in the position shown in Fig. 2. This position of the lever n' and weight h' holds the crank s' and the rod u in the smoke-pipe down, and the back damper u' is thereby kept closed and the smoke and gases pass off through the pipe N, reservoir A, and draft-pipe D'. When the feed-door is to be opened for any purpose—as for a fresh supply of coal—the weight t' is thrown into the position shown in Fig. 13 in dotted lines, which throws the curtain inside away from in front of the door. As the door is opened the lever s is relieved and the weight h', no longer held by the rod h, falls into the position shown in Fig. 3. This raises the crank s' and the rod u, and the back damper u' is opened or raised, allowing the gases and smoke to pass directly out. If it is desired to open the back damper to create a more powerful direct draft at any time, the rod h may be unhooked from the lever s and the back damper u' will then be held open by the gravity of the weight h'. When the ashes need to be shaken down the weight g' in the dust-flue is thrown into the position shown in Fig. 2. The shaking-iron is then introduced into the proper socket in the grate, and the grate with its ring d is moved freely to and fro upon the rollers c, and the dust, which is caused by the shaking of the grate, and which usually falls and passes out through the ash-door, is caused by the draft to pass up, through the dust-flue g, through the pipes Y', into the combustion-chamber.

It will be seen that in my invention I obtain an increase of radiating-surface by the arrangement of the smoke-pipes N within the cold-air chamber below the plate L, and also by the arrangement of the pipes P' and their branches P'' within the combustion-chamber; and the back damper, which regulates the draft, is operated automatically by the opening or closing of the feed-door.

As the fire-pot is corrugated vertically the cold air passes up through the holes x in the circular plate H and up between the fire-brick and the fire-pot, operating to prevent the fire-pot from being burned out and supplying fresh air to the combustion-chamber.

The arrangement of the partitions a in the reservoir A operates to create an equal draft through the smoke-pipes N N, and all these parts of the furnace become more evenly heated, so that the cold air as it passes through the cold-air chamber comes in contact with these heated parts and becomes more heated itself.

The arrangement of the branch pipes P'', giving a greater amount of heating-surface as the air is about to leave the furnace, causes a greater expansion of the air at that point, and creates a stronger draft of cold air from below.

Having thus described my invention, what I claim as new, and desire to secure by Letters Patent, is—

1. The hot-air pipes P' having branches P'', all arranged in the combustion-chamber, and constructed substantially as described.

2. The curtain or fender suspended between the feed-door and the fire, in combination with the lever $t$ and weight $t'$ whereby it is held in position, substantially as set forth.

3. The dust-flue G having arranged therein the damper $g$, held in position by the weight $g'$, all substantially as set forth.

DWIGHT B. MONTAGUE.

Witnesses:
T. A. CURTIS,
CLARENCE E. BUCKLAND.